(12) United States Patent
House et al.

(10) Patent No.: US 6,258,755 B1
(45) Date of Patent: Jul. 10, 2001

(54) CHITOSAN-CONTAINING WELL DRILLING AND SERVICING FLUIDS

(75) Inventors: Roy F. House, Houston, TX (US); Jack C. Cowan, Lafayette, LA (US)

(73) Assignee: Venture Innovations, Inc., Lafayette, LA (US)

( * ) Notice: Subject to any disclaimer, the term of this patent is extended or adjusted under 35 U.S.C. 154(b) by 0 days.

(21) Appl. No.: 09/222,293

(22) Filed: Dec. 28, 1998

(51) Int. Cl.$^7$ ............................. C09K 7/02; C08B 37/08
(52) U.S. Cl. ................ 507/110; 507/141; 507/145; 536/20; 536/55.3
(58) Field of Search ............................... 507/110, 209, 507/211, 141, 145; 586/20, 55.3

(56) References Cited

U.S. PATENT DOCUMENTS

| | | | |
|---|---|---|---|
| 2,670,329 | * 2/1954 | Jones | 507/211 |
| 4,424,346 | * 1/1984 | Hall et al. | 536/20 |
| 4,579,942 | * 4/1986 | Brode et al. | 507/209 |
| 4,659,700 | * 4/1987 | Jackson | 536/20 |
| 4,956,104 | * 9/1990 | Cowan et al. | 507/110 |
| 4,970,150 | * 11/1990 | Yaku et al. | 536/20 |
| 5,442,048 | * 8/1995 | Meister et al. | 536/20 |
| 5,747,475 | * 5/1998 | Nordquist et al. | 536/20 |
| 5,916,849 | 6/1999 | House | 507/110 |
| 5,922,851 | * 7/1999 | Kuhn et al. | 536/20 |
| 5,928,653 | * 7/1999 | Vanstraceele et al. | 424/401 |
| 6,123,159 | 9/2000 | Brookey et al. | 175/72 |

* cited by examiner

*Primary Examiner*—Philip Tucker
(74) *Attorney, Agent, or Firm*—Roy F. House

(57) ABSTRACT

Disclosed are a process for the preparation of pseudoplastic, shear thinning chitosan-containing fluids, and a method of enhancing the thermal stability of such fluids. Pseudoplastic fluids useful oil and/or gas wells, particularly drilling fluids, drill-in fluids, workover fluids, completion fluids, perforating fluids, filter cake removal fluids, various pills, and the like, are prepared by solublizing chitosan in an acidic solution and thereafter raising the pH above about 7.0 by the addition of a basic compound thereto. The thermal stability of such fluids is enhanced by incorporating into the fluids certain aldose or ketose sugars, oligosaccharides of such sugars, and mixtures thereof, optionally together with a water soluble bisulfite compound.

25 Claims, No Drawings

ND SERVICING FLUIDS

CHITOSAN-CONTAINING WELL DRILLING AND SERVICING FLUIDS

This invention was made with Government support under Award No. 9761273 awarded by the National Science Foundation. The Government has certain rights in this invention.

FIELD OF THE INVENTION

The invention relates to viscosified fluids, particularly fluids used in the drilling and/or servicing of oil and/or gas wells, and particularly drilling fluids, drill-in fluids, workover fluids, completion fluids, perforating fluids, fracturing fluids, acidizing fluids, spotting fluids, filter cake removal fluids, various pills, and the like. The invention provides chitosan viscosified fluids and methods of enhancing the thermal stability of such fluids.

BACKGROUND OF THE INVENTION

It is known to produce viscoelastic fluids for use in oil well drilling and servicing, especially for the so called "drill-in" fluids used in horizontal drilling within a hydrocarbon-bearing formation. See for example the following references: "Drill-In Fluids Improve High Angle Well Production," p. 5–11, Supplemental to the Petroleum Engineer International, March, 1995; and "Soluble Bridging Particle Drilling System Generates Successful Completions In Unconsolidated Sand Reservoirs," Jay Dobson and Delton Kayga, presented at the 5th International Conference On Horizontal Well Technology, Amsterdam, The Netherlands, Jul. 14–16, 1993.

Such fluids are characterized as having a rheological profile which is shear thinning, having a high viscosity at extremely low shear rates and a low viscosity at high shear rates. Thus such fluids are pseudoplastic having a high yield stress.

This type of rheology is produced by hydrating in the fluid certain water soluble polymers. These polymers presently known are biopolymers, i.e., microbially produced polysaccharides or heteropolysaccharides, and are well known in the art.

There is a need for fluids which exhibit a high low shear rate viscosity which are shear thinning.

Chitosan is a partially or fully deacetylated form of chitin, a naturally occurring polysaccharide. Structurally, chitin is a polysaccharide consisting of beta-(1→4)2-acetamido-2-deoxy-D-glucose units, some of which are deacetylated. The degree of deacetylation usually varies between 8 and 15 percent, but depends on the species from which the chitin is obtained, and the method used for isolation and purification.

Chitin is not one polymer with a fixed stoichiometry, but a class of polymers of N-acetylglucosamine with different crystal structures and degrees of deacetylation, and with fairly large variability from species to species. The polysaccharide obtained by more extensive deacetylation of chitin is chitosan.

Like chitin, chitosan is a generic term for a group of polymers of acetylglucosamine, but with a degree of deacetylation of between 50 and 100 percent. Chitosan is the beta-(1-4)-polysaccharide of D-glucosamine, and is structurally similar to cellulose, except that the C-2 hydroxyl group in cellulose is substituted with a primary amine group in chitosan. The large number of free amine groups (pKa= 6.3) makes chitosan a polymeric weak base. Both chitin and chitosan are insoluble in water, dilute aqueous bases, and most organic solvents. However, unlike chitin, chitosan is soluble in dilute aqueous acids, usually carboxylic acids, as the chitosonium salt. Solubility in dilute aqueous acid is therefore a simple way to distinguish chitin from chitosan.

Chitosan is unique in that it is a polysaccharide containing primary amine groups. Chitosan forms water-soluble salts with many organic and inorganic acids.

It is known to prepare chitosan derivatives by attaching various groups to one or more hydroxyl groups of the chitosan, as in various cellulose derivatives, and/or in attaching various groups to the primary amino group of chitosan. Thus it is disclosed in Hall and Yalpani U.S. Pat. No. 4,424,346 that chitosan can be reacted with various aldehydes by Schiff base formation with the primary amino group. The reaction is generally conducted in the presence of a reducing agent, specifically sodium cyanoborohydride, to reduce the imino group formed to a secondary amino group, i.e., the chitosan undergoes reductive alkylation. Among the aldehyde reactants are aldose or ketose sugars, or sugars oxidizable or hydrolyzable to aldoses or ketoses, for example, glucose, galactose, arabinose, xylose, N-acetylglucosamine, lactose, cellobiose, maltose, and melibiose. These chitosan derivatives are disclosed to offer a wide range of solubility, gelling and compatibility properties.

It is also known to incorporate certain water soluble chitin derivatives into clay-containing aqueous drilling muds for controlling the viscosity, gel strength, and fluid loss of the drilling mud. See Jones U.S. Pat. No. 2,670,329.

It is well known that polysaccharides are degraded by heat as the temperature of the fluid containing them is increased. The thermal degradation of the polysaccharides decreases the viscosity of the fluid, most especially the low shear rate viscosity which provides the fluid with its desirable characteristics as many other water soluble polymers and other materials can provide the high shear rate viscosity required. Thus there is a need for enhancing the thermal stability of polysaccharide-containing aqueous fluids.

SUMMARY OF THE INVENTION

We have now determined that viscous fluids suitable for use as well drilling and servicing fluids can be prepared by solublizing chitosan in aqueous acidic solutions and thereafter raising the pH of the solution to an alkaline pH whereby fluids having an enhanced low shear rate viscosity (hereinafter sometimes referred to as ELSRV) and which are extremely shear thinning are obtained.

We have further determined that the thermal stability of alkaline aqueous fluids viscosified with chitosan is enhanced by incorporating into the fluids certain aldose or ketose sugars and/or oligosaccharides of such sugars as set forth hereinafter, optionally together with a water soluble bisulfite compound.

The preferred oligosaccharide is lactose, dextrose or a mixture comprised primarily of pentosans and hexosans containing from two to ten combined sugar units selected from the group consisting of arabinose, mannose, galactose, glucose, and xylose sugar units, and mixtures thereof, the mixture most preferably comprising the water soluble portion of thermally hydrolyzed lignocellulose.

It is an object of this invention to provide a process for enhancing the thermal stability of aqueous chitosan-containing fluids as evidenced by the viscosity of the fluids, and the fluids prepared thereof.

It is another object of this invention to provide a process for preparing a well drilling and servicing fluid which comprises forming an acidic chitosan solution and thereafter adding a basic compound to raise the pH to above about 7.0, wherein the concentration of chitosan is sufficient to provide the fluid with a low shear rate viscosity of at least 1,000 centipoise and a shear thinning index greater than about 10, preferbaly a low shear rate viscosity at least about 5,000 centipoise, most preferably at least about 10,000 centipoise.

It is also an object of the invention to provide a rotary process for drilling a well wherein there is circulated in the wellbore during drilling an alkaline aqueous drilling fluid having a low shear rate viscosity of at least 1,000 centipoise and a shear thinning index greater than about 10 comprising forming an acidic chitosan solution, thereafter adding a basic compound to raise the pH to above about 7.0, and circulating the resulting fluid in the wellbore during drilling.

Still another object of the invention is to provide chitosan-containing well drilling and servicing fluids as disclosed herein.

These and other objects of the invention will be apparent to one skilled in the art upon reading the specification and claims hereof.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

PREFERRED EMBODIMENTS OF THE INVENTION

The chitosans useful in the present invention will have at least 50% of their amino groups deacetylated, i.e., the degree of deacetylation is at least 50%, preferably at least 70%, and most preferably from about 85% to about 100%.

One aspect of the invention is to prepare aqueous pseudoplastic fluids useful as oil and gas well drilling and servicing fluids, the fluids having a Brookfield 0.5 rpm viscosity (hereinafter sometimes referred to as "low shear rate viscosity" or "LSRV") of at least 1,000 centipoise and a shear thinning index (hereinafter sometimes referred to as "STI") greater than about 10. The STI is the ratio of the Brookfield viscosity at 0.5 rpm to the Brookfield viscosity at 100 rpm and is an indication of the shear thinning, pseudoplastic characteristic of the fluids. Preferably the LSRV is at least about 5,000 centipoise, most preferably at least about 10,000 centipoise.

Such aqueous pseudoplastic fluids are prepared by forming an aqueous acidic chitosan solution and thereafter adding a basic compound to raise the pH above about 7.0, preferably at least about 8.0, wherein the concentration of chitosan is sufficient to provide the fluid with a LSRV of at least 1,000 centipoise and a STI greater than about 10. Generally the chitosan concentration will be from about 1.5 grams/liter to about 30 grams/liter, preferably from about 3.0 grams/liter to about 22.5 grams/liter.

A wide variety of acids can be used to solublize chitosan. Such acids include inorganic acids such as hydrochloric acid, nitric acid, and sulfamic acid, and water soluble organic acids represented by the formula: $R-(COOH)_n$ wherein n has a value of 1 to 3 and R represents a mono- or divalent organic radical composed of carbon, hydrogen, and optionally at least one of oxygen, nitrogen, and sulfur. Exemplary organic acids are the mono- and dicarboxylic acids selected from the group consisting of formic, acetic, N-acetylglycine, acetylsalicylic, fumaric, glycolic, iminodiacetic, itaconic, lactic, citric, maleic, malic, nicotinic, 2-pyrrolidone-5-carboxylic, salicylic, succinamic, succinic, ascorbic, aspartic, glutamic, glutaric, malonic, pyruvic, sulfonyldiacetic, thiodiacetic, thioglycolic acids and mixtures thereof.

The preferred acid used to prepare the acidic chitosan solution is selected from the group consisting of (a) carboxylic acids containing from one to three carbon atoms, (b) substituted carboxylic acids containing at least one radical per molecule selected from the group consisting of hydroxyl, amino, chloro, and thio, and containing from one to three carbon atoms, (c) hydrochloric acid, and (d) mixtures thereof.

The concentration of acid should be sufficient to decrease the pH of the solution to less than about 4.5, preferably 4.0 or less.

The basic compound used to raise the pH to the alkaline range can be any compatible base which can be determined by routine testing. Preferred basic compounds are the alkali metal and ammonium hydroxides, carbonates and bisulfites, magnesium hydroxide and oxide, calcium hydroxide and oxide, and mixtures thereof. Organic bases such as low molecular weight amines and hydroxyamines, such as ethanolamine and the like, can be used to raise the pH, also in combination with an inorganic basic compound.

The water base borehole fluids and well servicing fluids of this invention generally will contain materials well known in the art to provide various characteristics of properties to the fluid. Thus the fluids may contain one or more viscosifiers or suspending agents in addition to the chitosan, weighting agents, corrosion inhibitors, soluble salts, biocides, fungicides, seepage loss control additives, bridging agents, deflocculants, lubricity additives, shale control additives, pH control additives, and other additives as desired.

The borehole fluids may contain one or more materials which function as encapsulating or fluid loss control additives to restrict the entry of liquid from the fluid to the contacted shale. Representative materials known in the art include partially solublized starch, gelatinized starch, starch derivatives, cellulose derivatives, humic acid salts (lignite salts), lignosulfonates, gums, synthetic water soluble polymers, and mixtures thereof.

The oil and gas well drilling and servicing fluids of this invention preferably have a pH in the range from about 7.0 to about 11.5, most preferably from 8 to about 11.

If desired, water soluble potassium compounds can be incorporated into the fluids of this invention to increase the potassium ion content thereof. Thus it is known to add potassium chloride, potassium formate, potassium acetate, and the like to fluids to enhance the shale stabilizing characteristics of the fluids.

The well drilling and servicing fluids of this invention contains an aqueous phase which may be fresh water, a natural brine, sea water or a formulated brine. The formulated brine is manufactured by dissolving one or more soluble salts in water, a natural brine, or sea water. Representative soluble salts are the chloride, bromide, acetate and formate salts of potassium, sodium, calcium, magnesium and zinc.

The borehole fluid of this invention is circulated or spotted within a borehole during well drilling or servicing operations as is well known in the art. Fracturing fluids are used to hydraulically fracture subterranean formations as is well known in the art.

It is another aspect of the invention to provide aqueous chitosan-containing well drilling and servicing fluids which have enhanced thermal stability as indicated by the viscosity of the fluids. The thermal stability of an aqueous chitosan-containing fluid is enhanced by adding to the fluid an oligosaccharide of aldose or ketose sugars. Preferably the sugar is selected from the group consisting of lactose, arabinose, galactose, glucose, mannose, xylose, and mixtures thereof. The oligosaccharide contains from two to about ten combined sugar units.

The preferred oligosaccharide is lactose, a disaccharide containing one glucose sugar unit and one galactose sugar unit per molecule. Other suitable oligosaccharides include such disaccharides as dextrose, maltose, melibiose, and cellobiose.

A mixture of oligosaccharides (hereinafter sometimes referred to as "OSM") useful in the present invention is obtained from the thermal hydrolysis of lignocellulose materials. The thermal hydrolysis may be carried out in any one of several manners such as by subjecting wood of trees and woody materials of corn stalks, cane, and other vegetable growths to the action of steam under elevated temperatures and pressures. The OSM may also be obtained by acid hydrolysis of lignocelluloses as well as by saccharification of wood. Preferably, however, the thermal hydrolysis is carried out by charging wood chips to a closed chamber (e.g., a gun as set forth in Mason U.S. Pat. No. 1,824,221, incorporated herein by reference), subjecting the chips to pressure of about 200–1200 pounds per square inch and a temperature of about 200–300° C. for approximately 30 minutes to 5 seconds, respectively, in the presence of steam, and then discharging the woody material from the gun through a constricted discharge means therein into a zone of lower pressure, preferably atmospheric pressure, thereby exploding the wood chips into comparatively finely divided elongated fibers. Under this treatment the wood undergoes hydrolysis, and water-insoluble and readily hydrolyzable constituents thereof are rendered soluble or dispersible in water. These water solubles are removed from the fiber, which may be accomplished by washing the fiber in water or by squeezing the fiber with rolls and/or screws and the like apparatus. See for example Boehm U.S. Pat. No. 2,224,135, incorporated herein by reference. The water solubles can be concentrated or rendered solid by removing water therefrom, as by evaporation, drying, etc.

Water solubles resulting from such hydrolysis of lignocellulose materials as a class are applicable to this invention. A typical analysis of the water solubles, the OSM of this invention, made from pine wood is as follows: hexosans, 40% by weight; pentosans, 30% by weight; lignin, 15% by weight; non-sugar carbohydrates, 10% by weight; and gums, 5% by weight. The constituents of the OSM will vary somewhat depending on the type of lignocellulose material hydrolyzed and the conditions, e.g., time, temperature, pressure, etc. Depending upon these conditions, the constituents of the OSM can vary roughly as follows: pentosans and hexosans, 60–80% by weight; lignin, 5–25% by weight; non-sugar carbohydrates, 5–15% by weight; and gums, 2–8% by weight. From the above description it will be seen that the major proportion of the water solubles consists of carbohydrate material. A more detailed analysis of the water solubles has indicated that the carbohydrate mixture is composed of oligosaccharides consisting of mannose, arabinose, glucose, galactose, and xylose sugar units. The crude water solubles from which relatively all of the suspended material has been removed consists almost entirely of the above described oligosaccharide mixture. There is a relatively small fraction present, about up to about 15% thereof, of monosaccharides. A larger fraction of the dissolved solids, i.e., greater than about 50% thereof, consists of hexose and pentose oligosaccharides containing from 2 to 5 of the corresponding monosaccharide sugar units which are predominantly those named above. The remainder of the dissolved solids has been found to consist of oligosaccharides having more than about 6 sugar units of the same 5 and 6 carbon characters. In most instances, the filter water solubles contain only from about 3 to about 5% of lignin.

Other oligaccharide mixtures useful in the practice of this invention include cane syrup solids, corn solubles, and the like.

Incorporation of the oligosaccharide into aqueous ELSRV well drilling and servicing fluids which contain chitosan hydrated (solublized or dispersed) therein enhances the thermal stability of the fluids as measured by viscosity, particularly the low shear rate viscosity, i.e., the viscosity at less than about one sec$^{-1}$.

The minimum concentration of the oligosaccharide incorporated into the aqueous chitosan-containing fluids is that amount, as determined by routine testing, which increases the thermal stability of the fluid. In the case of these ELSRV fluids, this is determined by evaluating the low shear rate viscosity of the fluid after aging at the desired temperature and comparing the results obtained with those of the fluid which does not contain the oligosaccharide.

Generally the concentration of the oligosaccharide will be from about 0.7 kg/m$^3$ (0.25 ppb) to about 57 kg/m$^3$ (20 ppb), preferably from about 1.4 kg/m$^3$ (0.5 ppb) to about 57 kg/m$^3$ (20 ppb), most preferably from about 2.85 kg/m$^3$ (1.0 ppb) to about 43 kg/m$^3$ (15 ppb).

It has been disclosed in Fuller U.S. Pat. No. 2,713,029 and Brink et al. U.S. Pat. No. 2,713,030 that the addition of small amounts of the OSM to clay-water drilling mud systems, such as from about 0.07–1.75 pounds of OSM per 42 gallon barrel of mud, imparts thereto low viscosity and gel strength.

Additionally, there may be added to the chitosan-containing fluids, in addition to the oligosaccharide of aldose or ketose sugars, a water soluble bisulfite compound to further enhance the thermal stability of the fluids. Representative bisulfite compounds are the alkali metal metabisulfites, such as lithium, sodium, potassium, and cesium metabisulfite, ammonium bisulfite, calcium bisulfite, magnesium bisulfite and the like.

Another aspect of the invention is to utilize the fluids disclosed herein in a process for drilling a well in a conventional rotary process wherein a drilling fluid is circulated in the wellbore during drilling.

In order to more completely describe the invention, the following non-limiting examples are given. In these examples and in this specification, the following abbreviations may be used: cc=cubic centimeters; g=gram; kg=kilogram; m$^3$=cubic meter; ppb=pounds per 42 gallon barrel; sec.=seconds; PV=API plastic viscosity in centipoise; YP=API yield point in pounds per 100 square feet; rpm=revolutions per minute; GS=API gel strength in pounds per 100 square feet; LSRV=low shear rate viscosity in centipoise as determined with a Brookfield Viscometer at 0.5 rpm; STI=the shear thinning index obtained with a Brookfield Viscometer, which is the ratio of the 0.5 rpm viscosity to the 100 rpm viscosity; SMB=sodium metabisulfite; HOAC=glacial acetic acid; ELSRV=enhanced low shear rate viscosity; and OSM=oligosaccharide mixture obtained from thermally hydrolyzed wood.

EXAMPLE 1

Fluids containing 3.5 ppb (1% w/v) chitosan and 0.6 gal/bbl (1.4% by volume) glacial acetic acid were prepared by mixing in tap water in a Waring Blendor set on low speed for five minutes. Thereafter the additives set forth in Table 1 were added and the mixing continued for 3 minutes. The initial Brookfield viscosity was obtained.

Then the fluids were static aged at 185° F. for 16 hours, cooled to room temperature, mixed, and the Brookfield viscosity obtained. Fluids 1–4, 1–6, and 1–7 were gelled fluids. These were diluted in the Waring Blendor to 1.9 ppb chitosan and 10.9 ppb OSM and the Brookfield viscosities obtained. The data obtained are set forth in Table 1. Various observations were made during evaluation of the fluids as indicated in Table 1 and the Notes to Table 1.

The data indicate that lactose reacted with chitosan at acid pH at 185° F. to produce a polymer which is soluble at basic pH, and at basic pH, the OSM enhanced the thermal stability of the chitosan-containing fluids.

EXAMPLE 2

Fluids containing 2.0 ppb chitosan and 0.6 gal/bbl glacial acetic acid were prepared by mixing in tap water in a Waring Blendor set on low speed for three minutes. Thereafter the additives set forth in Table 2 were added and the mixing continued for two minutes. Ten ppb soda ash (sodium carbonate) were added and mixed for three minutes. The initial Brookfield viscosity at 0.5 rpm and 100 rpm, and the Fann API rheology were obtained. The fluids were then static aged at 185° F. for 16 hours, cooled to room temperature, and mixed for one minute, and re-evaluated. The data obtained are set forth in Table 2.

The data indicate that the dextrose, lactose, fructo-oligosaccharides, and the oligosaccharide mixture which is the water soluble portion of thermally hydrolyzed lignocellulose all enhanced the thermal stability of the pseudoplastic chitosan-containing fluids. Also, the sodium metabisulfite enhanced the thermal stability when used together with the aldose sugars.

EXAMPLE 3

Fluids containing 3.5 ppb chitosan, 0.6 gal/bbl glacial acetic acid, 10.0 ppb soda ash, and the additives set forth in Table 3 were prepared and evaluated as in Example 2. The data indicate that the thermal stability of the pseudoplastic chitosan-containing fluids were substantially increased by the combined addition of sodium metabisulfite and the oligosaccharide, either lactose or the oligosaccharide mixture from thermally hydrolyzed lignocellulose, to the fluids.

TABLE 1

| All Fluids Contain 3.5 ppb Chitosan, 0.6 gal/bbl Glacial Acetic Acid | | | | | |
|---|---|---|---|---|---|
| Fluid | 1 | 2 | 3 | 4 | 5 |
| OSM, ppb | 0 | 0 | 0 | 0 | 20 |
| Lactose, ppb | 0 | 10 | 10 | 0 | 0 |
| SMB, ppb | 0 | 0 | 2.3 | 0 | 0 |
| Soda Ash, ppb | 0 | 0 | 0 | 10 | 10 |
| NOTE | — | — | — | — | — |

TABLE 1-continued

| All Fluids Contain 3.5 ppb Chitosan, 0.6 gal/bbl Glacial Acetic Acid | | | | | |
|---|---|---|---|---|---|
| Fluid | 1 | 2 | 3 | 4 | 5 |
| INITIAL BROOKFIELD RHEOLOGY | | | | | |
| 0.5 rpm(× $10^{-3}$) | 190 | 55 | 48 | 18.6 | 19 |
| 100 rpm | 4,500 | 3,320 | 3,080 | 505 | 383 |
| STI | 42 | 17 | 16 | 37 | 50 |
| NOTE | 1 | — | — | — | — |
| AFTER STATIC AGING AT 185° F. FOR 16 HRS., MIXING | | | | | |
| 0.5 rpm (× $10^{-3}$) | 0.4 | 0.4 | 14 | 6 | 19 |
| 100 rpm | 142 | 162 | 1,785 | 302 | 428 |
| STI | 3 | 2.5 | 8 | 20 | 44 |
| NOTE | 2 | 3 | 4 | — | — |

NOTES TO TABLE 1

1. After setting quiescent 1 ¼ hr., the LSRV (0.5 rpm)=380,000. Spatulated vigorously. 0.5 rpm viscosity taken after indicated no. of minutes: 1'=85,000; 3'=200,000; 23'=280,000; 27'=270,000.
2. Added 10 ppb $Na_2CO_3$. First formed a viscous, clear gel. On continued shearing, gel broken down to smooth "applesauce"-type fluid. 0.5 rpm/100 rpm=18,000/350.
3. Added 10 ppb $Na_2CO_3$. Formed stiff, clear gel, jello-like. 329 g fluid diluted with 274 g water to approx. 1.8 ppb chitosan, 5.15 ppb lactose. 0.5 rpm/100 rpm=54,000/1860.
4. Added 10 ppb $Na_2CO_3$. First formed a viscous, clear gel. On continued stirring, gel broken down but not completely. 0.5 rpm/100 rpm=24,500/588.

TABLE 2

| Chitosan, 2.0 ppb; HOAC, 0.6 gal/bbl; 10.0 ppb Soda Ash | | | | | | | |
|---|---|---|---|---|---|---|---|
| Fluid | 2-1 | 2-2 | 2-3 | 2-4 | 2-5 | 2-6 | 2-7 |
| Lactose (80%), ppb | 0 | 0 | 2.0 | 2.0 | 0 | 0 | 0 |
| Dextrose, ppb | 0 | 2.0 | 0 | 0 | 0 | 0 | 0 |
| Fructo-oligosaccharides, ppb | 0 | 0 | 0 | 0 | 2.0 | 0 | 0 |
| OSM, ppb | 0 | 0 | 0 | 0 | 0 | 4.15 | 2.5 |
| SMB, ppb | 0 | 0 | 0 | 0.75 | 0 | 0 | 1.0 |
| Initial Properties | | | | | | | |
| Brookfield Rheology | | | | | | | |
| LSRV (× $10^{-3}$) | 8.9 | 9.6 | 7.2 | 5.6 | 6.0 | 9.0 | 6.0 |
| STI | 58 | 50 | 55 | 47 | 49 | 62 | 38 |
| Fann Rheology | | | | | | | |
| PV | 6 | 4.5 | 5.5 | 4.5 | 5.5 | 8 | 6.5 |
| YP | 10.5 | 13 | 10 | 9.5 | 8.5 | 10 | 10.5 |
| 10 sec. G.S. | 7 | 7 | 5.5 | 5 | 5 | 7.5 | 7 |
| Properties After Aging at 185° F. for 16 Hours | | | | | | | |
| Brookfield Rheology | | | | | | | |
| LSRV (× $10^{-3}$) | 5.1 | 8.8 | 10 | 5.6 | 6.0 | 7.2 | 9.9 |
| STI | 50 | 51 | 72 | 48 | 49 | 49 | 51 |
| Fann Rheology | | | | | | | |
| PV | 4 | 5 | 5.5 | 6 | 4 | 7.5 | 5 |
| YP | 6.5 | 12 | 9 | 7 | 9 | 9 | 14 |
| 10 sec. G.S. | 4 | 6 | 5 | 4.5 | 4.5 | 5.5 | 8 |

TABLE 3

Chitosan, 3.5 ppb; HOAC, 0.6 gal/bbl; 10.0 ppb Soda Ash

| Fluid | 3-1 | 3-2 | 3-3 | 3-4 | 3-5 | 3-6 |
|---|---|---|---|---|---|---|
| Lactose (80%), ppb | 0 | 2 | 2 | 5 | 5 | 0 |
| OSM, ppb | 0 | 0 | 0 | 0 | 0 | 2 |
| SMB, ppb | 0 | 0 | 1.0 | 0 | 0.75 | 0.3 |
| Initial Properties | | | | | | |
| Brookfield Rheology | | | | | | |
| LSRV ($\times 10^{-3}$) | 25.0 | 36.8 | 27.4 | 22.2 | 18.8 | 22.7 |
| STI | 69 | 68 | 60 | 61 | 59 | 66 |
| Fann Rheology | | | | | | |
| PV | 12 | 14 | 10 | 9 | 9 | 7 |
| YP | 22 | 37 | 30 | 29 | 22 | 24 |
| 10 sec. G.S. | 9 | 14 | 13 | 12 | 10 | 11 |
| pH | 8.9 | 8.8 | 8.5 | 8.6 | 8.5 | 8.6 |
| Properties After Aging at 185° F. for 16 Hours | | | | | | |
| Brookfield Rheology | | | | | | |
| LSRV ($\times 10^{-3}$) | 2.5 | 6.2 | 16.0 | 4.5 | 15.9 | 9.3 |
| STI | 35 | 37 | 62 | 35 | 57 | 53 |
| Fann Rheology | | | | | | |
| PV | 6 | 11 | 8 | 8 | 9 | 6 |
| YP | 6 | 11 | 20 | 13 | 23 | 15 |
| 10 sec. G.S. | 2 | 4 | 10 | 5 | 7 | 6 |
| pH | 8.9 | 8.9 | 8.9 | 8.6 | 8.6 | 8.6 |

What is claimed is:

1. A method of enhancing the thermal stability of an aqueous chitosan-containing fluid which comprises adding to the fluid aldose or ketose sugars, oligosaccharides of such sugars, and mixtures thereof, and a water soluble bisulfite compound.

2. The method of claim 1 wherein the sugar is selected from the group consisting of arabinose, galactose, glucose, mannose, xylose, and mixtures thereof.

3. The method of claim 2 wherein the oligosaccharide contains from two to ten combined sugar units.

4. The method of claim 1 wherein there is added to the fluid (a) lactose, (b) dextrose, (c) an oligosaccharide mixture comprising pentosans and hexosans containing from two to ten combined sugar units selected from the group consisting of arabinose, galactose, glucose, mannose, xylose, and mixtures thereof, and (d) mixtures thereof.

5. The method of claim 1 wherein there is added to the fluid a mixture of pentosans and hexosans containing from one to ten sugar units selected from the group consisting of arabinose, galactose, glucose, mannose, xylose, and mixtures thereof.

6. A method of enhancing the thermal stability of an aqueous chitosan-containing fluid which comprises adding to the fluid a mixture of pentosans and hexosans containing from one to ten sugar units selected from the group consisting of arabinose, galactose, glucose, mannose, xylose, and mixtures thereof, wherein the mixture is selected from the group consisting of the water soluble portion of thermally hydrolyzed lignocellulose, cane syrup solids, corn solubles, and mixtures thereof.

7. The method of claim 6 wherein the aqueous chitosan-containing fluid is alkaline.

8. The method of claim 6 wherein a water soluble bisulfite compound is added to the fluid.

9. The method of claim 6 wherein a water soluble bisulfite compound is added to the fluid and the pH of the fluid is made alkaline.

10. The method of claim 1, 2, 3, 4, or 5 wherein the fluid is alkaline.

11. A method of drilling a well using a conventional rotary drilling process wherein a drilling fluid is circulated in the wellbore during drilling comprising circulating as the drilling fluid an aqueous chitosan-containing fluid which additionally contains aldose or ketose sugars, oligosaccharides of such sugars, and mixtures thereof.

12. The method of claim 11 wherein the sugar is selected from the group consisting of arabinose, galactose, glucose, mannose, xylose, and mixtures thereof.

13. The method of claim 12 wherein the oligosaccharide contains from two to ten combined sugar units.

14. The method of claim 11 wherein there is added to the fluid (a) lactose, (b) dextrose, (c) an oligosaccharide mixture comprising pentosans and hexosans containing from two to ten combined sugar units selected from the group consisting of arabinose, galactose, glucose, mannose, xylose, and mixtures thereof, and (d) mixtures thereof.

15. The method of claim 11 wherein there is added to the fluid a mixture of pentosans and hexosans containing from one to ten sugar units selected from the group consisting of arabinose, galactose, glucose, mannose, xyloy and mixtures thereof.

16. The method of claim 11, 12, 13, 14, or 15 wherein the drilling fluid is alkaline.

17. A method of drilling a well using a conventional rotary drilling process wherein a drilling fluid is circulated in the wellbore during drilling comprising circulating as the drilling fluid an aqueous pseudoplastic fluid prepared by the process of forming an acidic chitosan solution and thereafter adding a basic compound to raise the pH above about 7.0, wherein the concentration of chitosan is sufficient to provide a fluid with a low shear rate viscosity of at least 1,000 centipoise and a shear thinning index greater than about 10.

18. The method of claim 17 wherein the acid in the acidic chitosan solution is selected from the group consisting of (a) carboxylic acids containing from one to three carbon atoms, (b) substituted carboxylic acids containing at least one radical per molecule selected from the group consisting of hydroxyl, amino, chloro, thio, and mixtures thereof, and containing from one to three carbon atoms, (c) hydrochloric acid, (d) sulfamic acid, and (e) mixtures thereof.

19. The method of claim 17 wherein the acid in the acidic chitosan solution is selected from the group consisting of formic, acetic, propionic, glycolic, choline and mixtures thereof.

20. The method of claim 17 wherein the basic compound is selected from the group consisting of ammonium hydroxide, magnesium oxide, magnesium hydroxide, an alkali metal hydroxide, an alkali metal carbonate, an alkali metal bicarbonate, an alkali metal bisulfite, and mixtures thereof.

21. The method of claim 17 wherein the basic compound is sodium carbonate and the acid in the acidic chitosan solution is selected from the group consisting of acetic, glycolic, and mixtures thereof.

22. The method of claim 17, 18, 19, 20, or 21 wherein the low shear rate viscosity of the fluid is at least 5,000 centipoise.

23. The method of claim 17, 18, 19, 20, or 21 wherein the low shear rate viscosity of the fluid is at least 10,000 centipoise.

24. The method of drilling a well using a conventional rotary drilling process wherein a drilling fluid is circulated in the weilbore during drilling comprising circulating as the drilling fluid a fluid prepared by the process of claim 6, 7, 8, or 9.

25. The method of claim 24 wherein the low shea rate viscosity of the fluid is at least 5,000 centipoise.

* * * * *